US007053823B2

(12) United States Patent
Cervinka et al.

(10) Patent No.: US 7,053,823 B2
(45) Date of Patent: May 30, 2006

(54) SYSTEM AND METHOD FOR CARGO PROTECTION

(75) Inventors: Alexandre Cervinka, Montreal (CA); Jean-Louis Gauvreau, Montreal (CA); Vincent Kassis, Mont-Royal (CA); Yvan Castilloux, Montreal (CA)

(73) Assignee: Newtrak Technologies, Inc., Montreal (CA)

( * ) Notice: Subject to any disclaimer, the term of this patent is extended or adjusted under 35 U.S.C. 154(b) by 315 days.

(21) Appl. No.: 10/613,773

(22) Filed: Jul. 3, 2003

(65) Prior Publication Data

US 2005/0017899 A1    Jan. 27, 2005

(30) Foreign Application Priority Data

Jul. 3, 2002    (CA)    ................................. 2392326

(51) Int. Cl.
*G01S 5/14* (2006.01)
*G08B 13/14* (2006.01)
*G08B 23/00* (2006.01)

(52) U.S. Cl. ........................ 342/357.07; 342/357.14; 340/568.1; 340/572.1

(58) Field of Classification Search ........... 342/357.07, 342/357.14; 340/426.18, 426.19, 539.13; 701/217
See application file for complete search history.

(56) References Cited

U.S. PATENT DOCUMENTS

| 3,961,166 A * | 6/1976 | Stobart ........................ 701/217 |
| 4,107,689 A * | 8/1978 | Jellinek ....................... 340/991 |
| 4,254,465 A | 3/1981 | Land ........................... 701/220 |
| 4,758,959 A | 7/1988 | Thoone et al. .............. 701/221 |
| 4,838,570 A | 6/1989 | Toikka et al. ............... 280/507 |
| 5,142,278 A | 8/1992 | Moallemi et al. ........... 340/436 |
| 5,223,844 A | 6/1993 | Mansell et al. ......... 342/357.07 |
| 5,311,173 A | 5/1994 | Komura et al. ......... 340/995.22 |
| 5,378,929 A | 1/1995 | Mor et al. .................... 303/89 |
| 5,862,511 A | 1/1999 | Croyle et al. ............... 701/213 |
| 5,870,029 A * | 2/1999 | Otto et al. ............. 340/825.36 |
| 5,941,934 A | 8/1999 | Sato ........................... 701/213 |
| 5,986,543 A | 11/1999 | Johnson .................. 340/426.19 |
| 5,991,692 A | 11/1999 | Spencer, II et al. ......... 701/217 |
| 6,024,655 A | 2/2000 | Coffee ......................... 473/407 |
| 6,067,007 A | 5/2000 | Gioia ..................... 340/426.19 |
| 6,111,539 A | 8/2000 | Mannings et al. ..... 342/357.09 |
| 6,150,923 A | 11/2000 | Johnson et al. .......... 340/384.6 |
| 6,169,515 B1 | 1/2001 | Mannings et al. ........ 342/357.1 |
| 6,188,959 B1 | 2/2001 | Schupfner ................... 701/217 |
| 6,308,134 B1 | 10/2001 | Croyle et al. ............... 701/220 |
| 6,317,683 B1 | 11/2001 | Ciprian et al. .............. 701/118 |
| 6,327,533 B1 | 12/2001 | Chou ......................... 701/207 |
| 6,339,370 B1 | 1/2002 | Rühl et al. .................. 340/436 |
| 6,367,888 B1 | 4/2002 | Kee et al. ..................... 303/89 |
| 6,378,959 B1 | 4/2002 | Lesesky et al. ......... 303/122.02 |

(Continued)

FOREIGN PATENT DOCUMENTS

EP    0814346 A1 * 12/1997

(Continued)

*Primary Examiner*—Gregory C. Issing
(74) *Attorney, Agent, or Firm*—Robert Brouillette

(57) ABSTRACT

A method and system for the detection, notification and tracking of cargo theft proposes to install, inside cargo to be protected, a tracking device having communication and dead reckoning capabilities. As long as the tracking device senses that it is within a virtual fence generated by an access point, it lays dormant. When the tracking device senses that it is no longer within the virtual fence it activates the dead reckoning capabilities and communicates with a central server to supply dead reckoning data thereto. The central server processes this data and determines the current location of the cargo.

25 Claims, 8 Drawing Sheets

U.S. PATENT DOCUMENTS

| | | | |
|---|---|---|---|
| 6,738,628 B1 * | 5/2004 | McCall et al. | 455/456.1 |
| 6,801,159 B1 * | 10/2004 | Swope et al. | 342/357.14 |
| 6,850,844 B1 * | 2/2005 | Walters et al. | 701/216 |
| 6,961,001 B1 * | 11/2005 | Chang et al. | 340/573.4 |
| 6,975,229 B1 * | 12/2005 | Carrender | 340/572.4 |
| 2002/0059075 A1 | 5/2002 | Schick et al. | 705/1 |
| 2002/0113735 A1 * | 8/2002 | Spratt | 342/464 |
| 2002/0115436 A1 | 8/2002 | Howell et al. | 455/426 |
| 2002/0177476 A1 * | 11/2002 | Chou | 455/574 |
| 2003/0006931 A1 * | 1/2003 | Mages | 342/357.06 |
| 2003/0091010 A1 * | 5/2003 | Garahi et al. | 370/338 |
| 2004/0021569 A1 * | 2/2004 | Lepkofker et al. | 340/568.1 |

FOREIGN PATENT DOCUMENTS

| | | |
|---|---|---|
| EP | 0 919 442 A2 | 6/1999 |
| GB | 2025185 A * | 1/1980 |
| WO | 00/62664 | 10/2000 |
| WO | 00/62664 A1 | 10/2000 |
| WO | 02/39063 | 5/2002 |

* cited by examiner

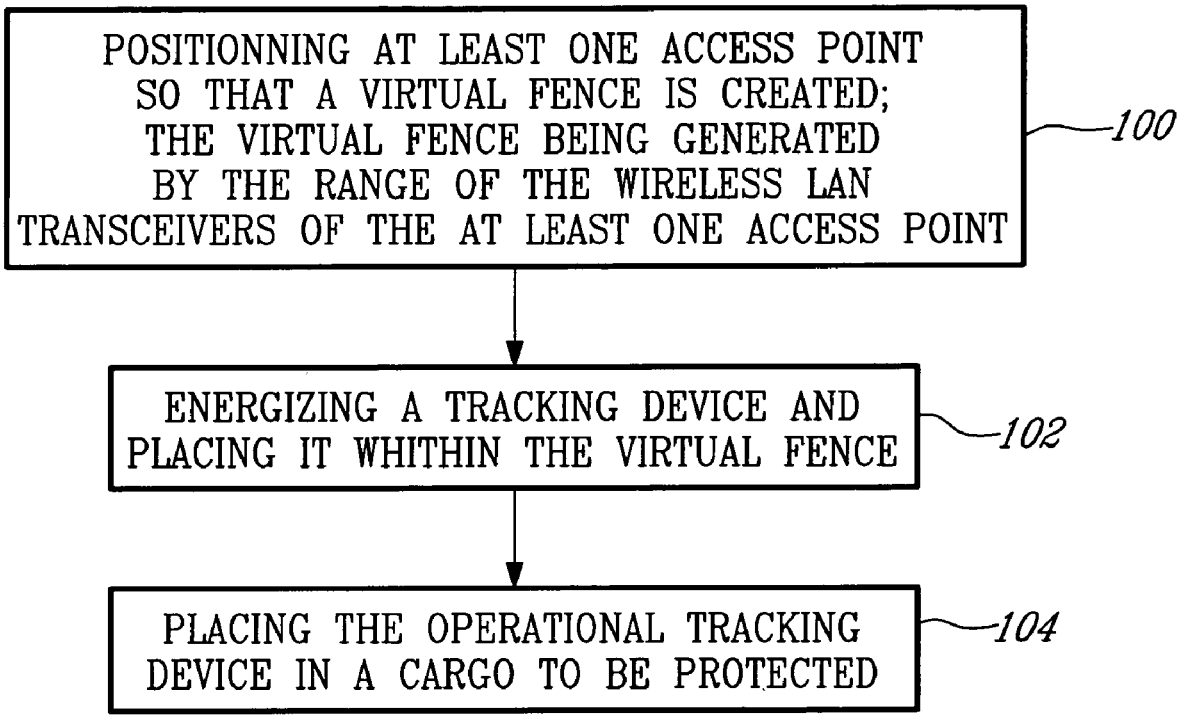
FIG_5

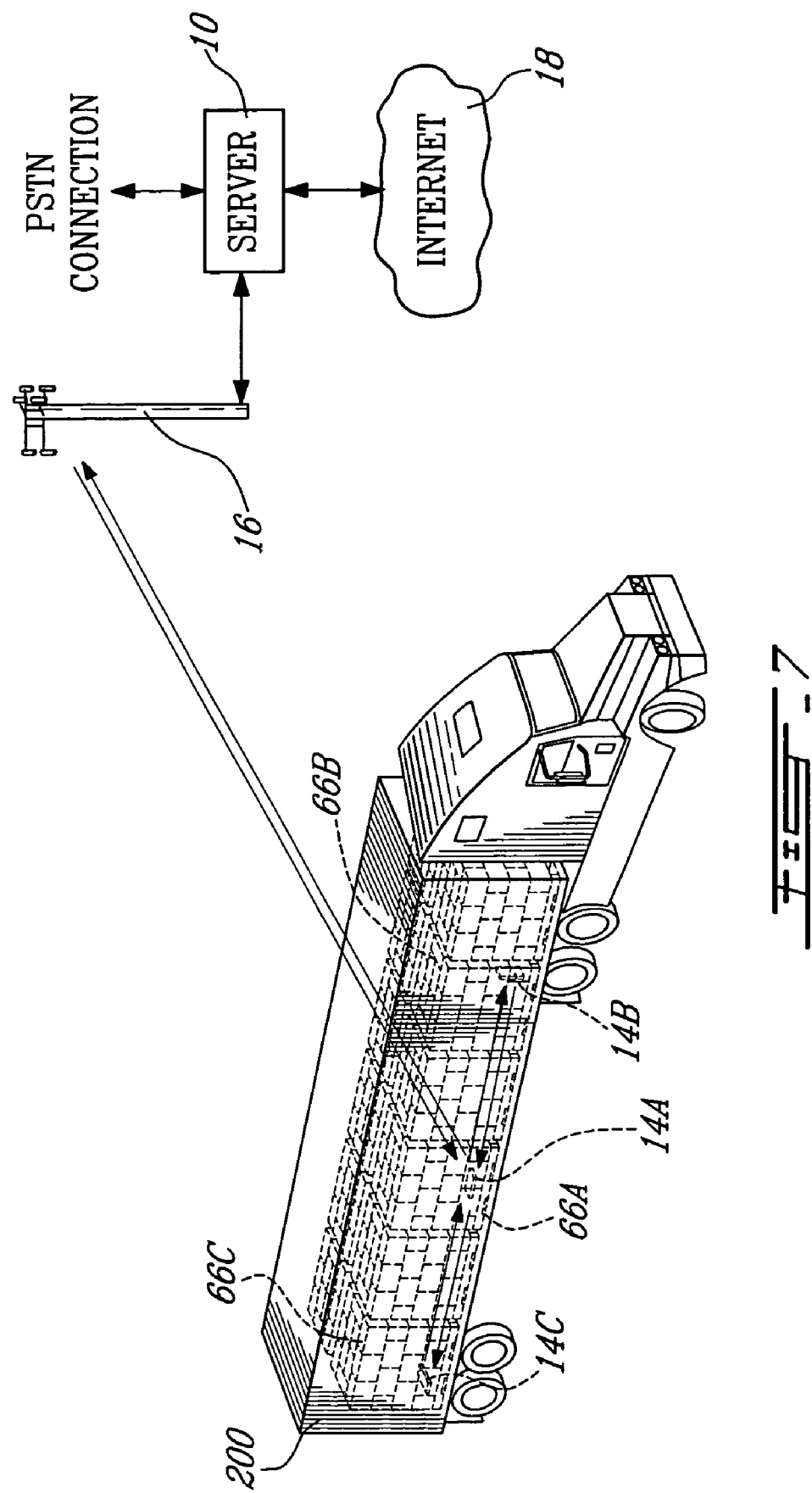

SYSTEM AND METHOD FOR CARGO PROTECTION

FIELD OF THE INVENTION

The present invention generally relates to theft detection, notification and tracking. More specifically, the present invention is concerned with a system and method for the detection, notification and tracking of cargo theft.

BACKGROUND OF THE INVENTION

With the increasing popularity of the Global Positioning System (hereinafter "GPS") finding the absolute position of an object above ground is now a relatively easy task. By combining a GPS receiver and a cellular phone transceiver and mounting the resulting device to a vehicle, it is also relatively easy to supply the position of the vehicle to a central location when the vehicle is reported as being stolen.

Accordingly, the prior art is replete with documents describing such systems and improvements to such systems. U.S. patent application Ser. No.2002/0115436 A1 entitled "Telematic System" and published on Aug. 22, 2002; and U.S. Pat. No. 5,986,543 entitled "Programmable vehicle monitoring and security system having multiple access verification devices" issued on Nov. 16, 1999 are good examples of such documents.

Since these methods and systems aim at tracking vehicles, it is possible to position the GPS receiver antenna so that it can receive the faint GPS signals used to compute the absolute position of the vehicle. However, such systems may not be used to track a device concealed in cargo since cargo is usually contained in enclosed spaces, such as trailers or warehouses, thereby further attenuating the already faint GPS signals.

OBJECTS OF THE INVENTION

An object of the present invention is therefore to provide a system and method for cargo protection.

SUMMARY OF THE INVENTION

More specifically, in accordance with the present invention, there is provided a system for the protection of cargo comprising:

a tracking device to be inserted in a cargo; the tracking device including a communication module and a dead reckoning module; the communication module being configured to communicate with a central server; and an access point including a GPS receiver and a communication module configured to communicate with the tracking device communication module; the access point being so configured as to periodically supply GPS position data to the tracking device;

wherein the tracking device is so configured that when the communication between the tracking module and the access point is lost, a last received GPS position data and dead reckoning data from the dead reckoning module are transmitted by the tracking module to the central server via the communication module of the tracking device.

According to another aspect of the present invention, there is provided a system for the protection of cargo comprising:

a tracking device to be inserted in a cargo; the tracking device including a communication module and a dead reckoning module; the communication module being configured to communicate with a central server; and an access point including a movement detector and a communication module configured to communicate with the tracking device communication module; the access point being so configured as to periodically communicate with the tracking device;

wherein the tracking device is so configured that when the communication between the tracking module and the access point is lost, dead reckoning data from the dead reckoning module are transmitted by the tracking module to the central server via the communication module of the tracking device.

According to a third aspect of the present invention, there is provided a system for the protection of cargo comprising:

cargo tracking means including communication means and dead reckoning means; the communication means being configured to communicate with a central server; and means for creating a virtual fence around the cargo; the virtual fence creating means including means for receiving GPS position data and communication means configured to communicate with the communication means of the cargo tracking means; the virtual fence creating means being so configured as to periodically supply GPS position data to the cargo tracking means;

wherein when the communication between the cargo tracking means and the virtual fence creating means is lost, a last received GPS position data and dead reckoning data from the dead reckoning means are transmitted to the central server via the cargo tracking means communication means.

According to yet another aspect of the present invention there is provided a method for the protection of cargo comprising the acts of:

providing a cargo tracking device to a cargo; the cargo tracking device including a communication module and a dead reckoning module;

creating a virtual fence around the cargo;

providing GPS position data to the cargo tracking device while the cargo is within the virtual fence;

when the cargo exits the virtual fence:

obtaining dead reckoning data from the dead reckoning module;

transmitting a last received GPS position data to a central server via the communication module of the cargo tracking device; and transmitting dead reckoning data to a central server via the communication module of the cargo tracking device.

It is to be noted that the expression "GPS" is to be construed herein and in the appended claims as both the conventional Global Positioning System and as any similar system adequate to supply the absolute position of an object.

It is also to be noted that the expression "virtual fence" is to be construed herein and in the appended claims as a the outer perimeter of a single "bubble" or as the outer perimeter of a plurality of intersecting bubbles as will be further described hereinbelow.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 5 is a flowchart illustrating the setup of the system of FIG. 1;

FIG. 7 is a diagram illustrating a plurality of stolen cargo in a trailer not provided with an access point.

DETAILED DESCRIPTION

In a nutshell, an embodiment of the present invention proposes to install, inside cargo to be protected, a tracking device having communication and dead reckoning capabilities. As long as the tracking device senses that it is within a virtual fence generated by at least one access point, it lays dormant. When the tracking device senses that it is no longer within the virtual fence it activates the dead reckoning capabilities and communicates with a central server to supply dead reckoning data thereto. The central server processes this data and determines the current location of the cargo.

Figure 1:
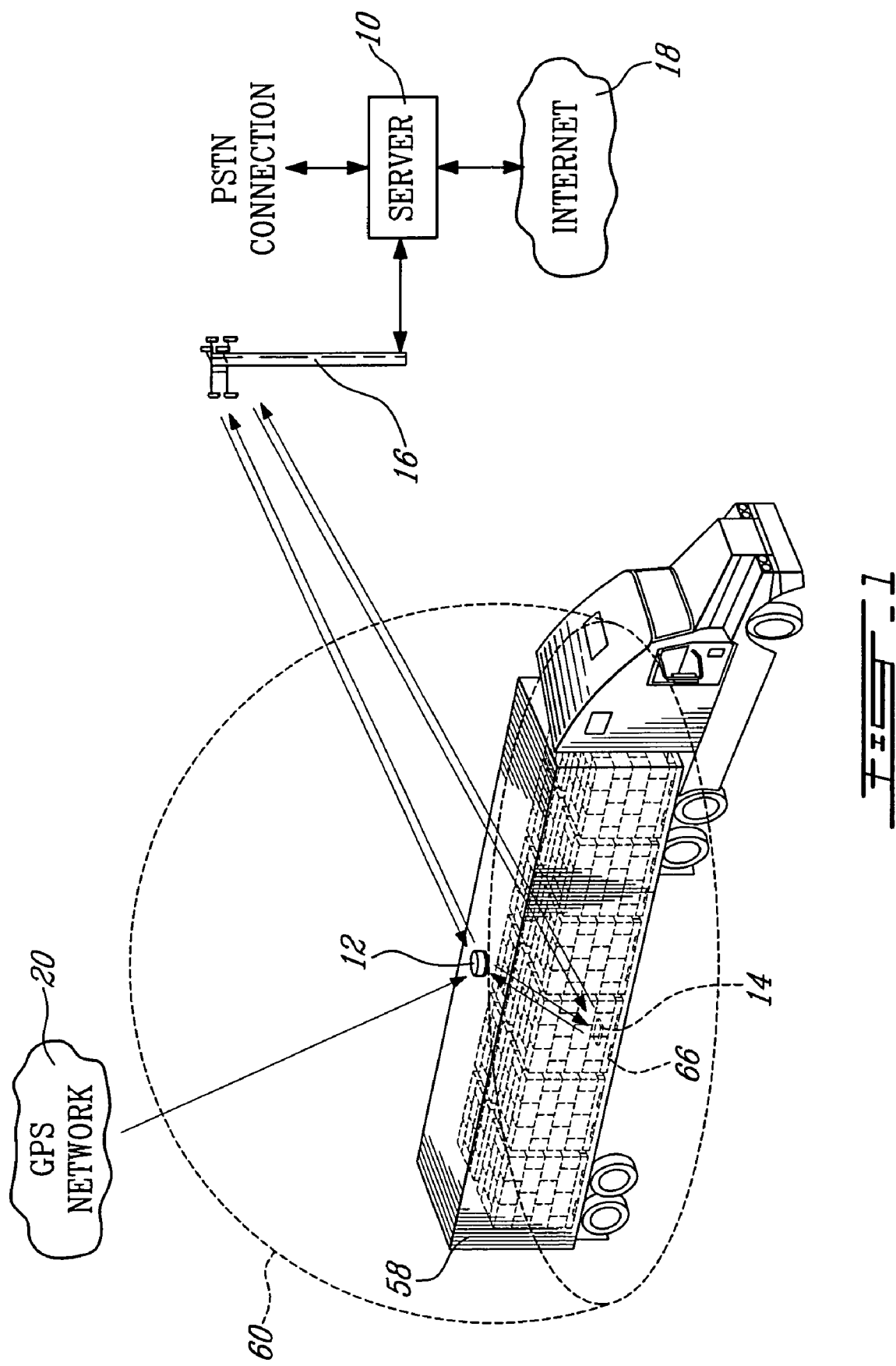
FIG. 1 is a diagram illustrating a system for cargo protection according to an embodiment of the present invention where the cargo is within a transport trailer.
Figure 2:
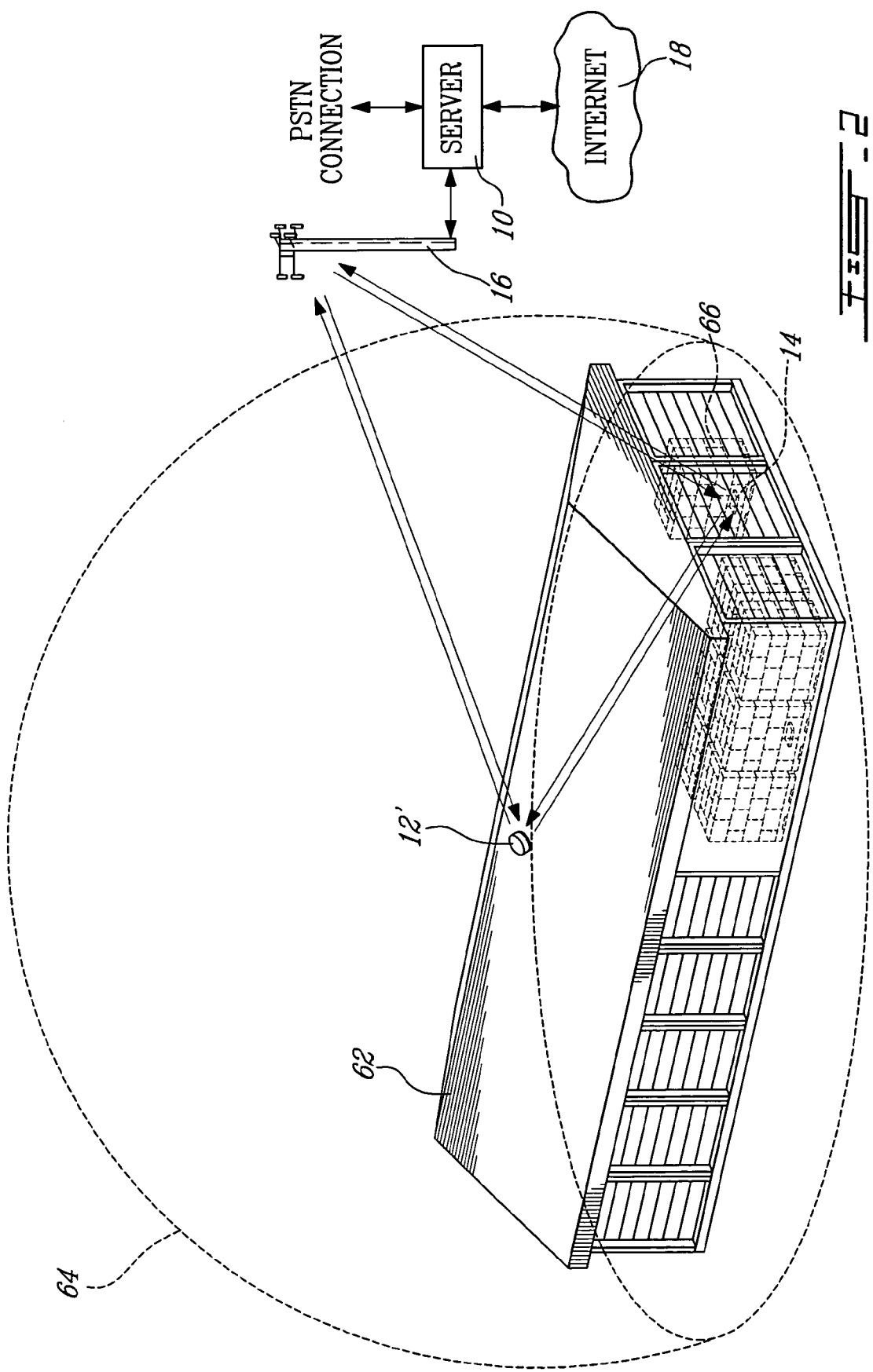
FIG. 2 is a diagram illustrating the system of FIG. 1 where the cargo is within a warehouse.

FIGS. 1 and 2 of the appended drawings illustrate a system for cargo protection where the cargo is located in a transport trailer and in a warehouse, respectively.

The cargo protection system includes a central server 10, an access point 12 and a tracking device 14. The central server 10 is in communication with a cellular network (represented by a cellular tower 16), for example via a PSTN (public switched telephone network) line. Optionally, the central server also has a link to a computer network such as the internet 18 and has other PSTN communication capabilities.

The access point 12 receives data from a GPS network 20 and may communicate with the central server 10 via the cellular network 16. As it will be further described hereinbelow, the reception of data from a GPS network by the access point 12' of FIG. 2 is optional since the access point 12' is a so-called fixed access point.

The tracking device 14 communicates with the access point 12, via a wireless LAN (Local Area Network) for example, and with the central server 10 via the cellular network 16.

Figure 3:
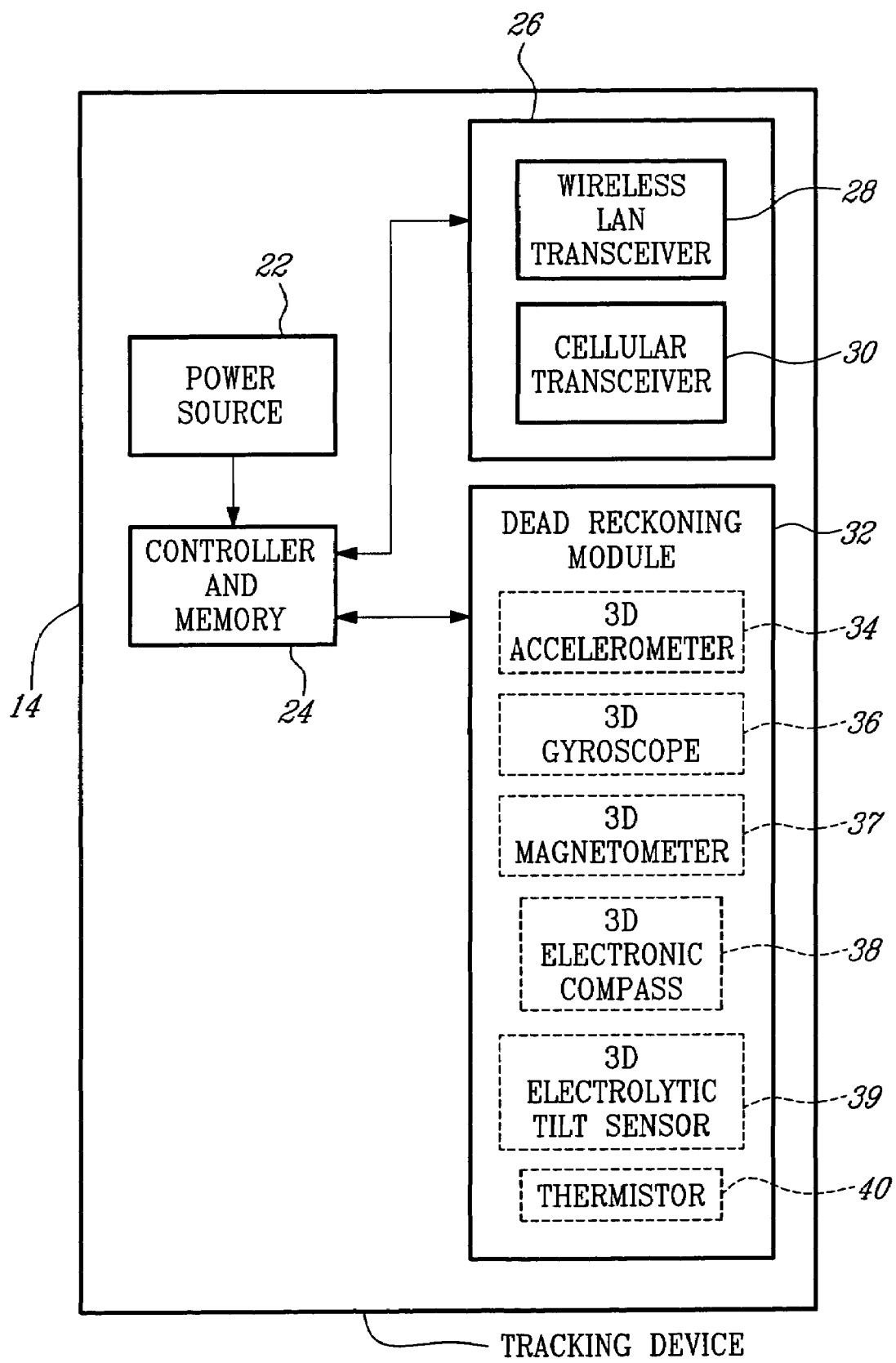
FIG. 3 is a block diagram of a tracking device that is part of the system of FIG. 1.

Turning now to FIG. 3 of the appended drawings, the various elements forming a tracking device 14 will be described.

The tracking device 14 includes a power source 22, usually in the form of a rechargeable battery, a controller 24 including memory, a communication module 26 including a wireless LAN transceiver 28 and a cellular transceiver 30 and a dead reckoning module 32 including various dead reckoning sensors such as, for example a 3D accelerometer 34, a 3D gyroscope 36, a 3D magnetometer 37, a 3D electronic compass 38, a 3D electrolytic tilt sensor 39 and a thermistor 40.

It is to be noted that dead reckoning techniques are believed well known in the art. Accordingly, these techniques will not be discussed in detail herein. However, it is to be noted that the use of 3D sensors such as accelerometers, gyroscopes, magnetometers and electronic compasses is advantageous since it allows the tracking device to be inserted in a cargo to be protected in any orientation. The use of a thermistor 40 is also interesting since it allows a better modeling of the sensors present in the dead reckoning module. It is also to be noted that the number and nature of the dead reckoning sensors used in the dead reckoning module 32 may vary, for example in function of the sensibility and precision of the various sensors.

The controller 24 is supplied by the power source 22 and is connected to both the communication module 26 and to the dead reckoning module. As it will be further described hereinbelow, the controller 24 may send and receive data to/from the access point 12 via the communication module 26 and receive dead reckoning data from the dead reckoning module 32 and store this data in its memory and/or send it via the communication module 26.

The tracking device 14 could be equipped with other elements such as a high-frequency sound generator, to help retrieve the device 14 once it is no longer required, and status LEDs.

A tracking device could be designed using a controller made by Texas Instruments under part number TMS 320-5470; a MEMS (microelectromechanical system) accelerometer made by Analog Devices under part number ADLX203 (mounted in 3D); a MEMS gyroscope made by Analog Devices under part number ADXRS150 (mounted in 3D), a magnetometer made by Honeywell under part number HMC1052 (mounted in 3D), an electronic compass made by Phillips under part number KMZ 51 (mounted in 3D), and an electrolytic tilt sensor made by Fredericks under part number 0717-4304 (mounted on 6 faces of a cube).

The wireless LAN transceiver 28 could use 802.11b, Bluetooth or proprietary spread-spectrum or ultra-wideband communication schemes. For example, the wireless LAN transceiver Spectrum24 made by Symbol could be used.

The cellular transceiver 30 could use IS-95 based CDMA (Code Division Multiple Access). For example, the cellular transceiver CDM-820-B made by Semax Wireless could be used. Of course, the cellular technology used should be compatible with the cellular network 16.

Figure 4A:
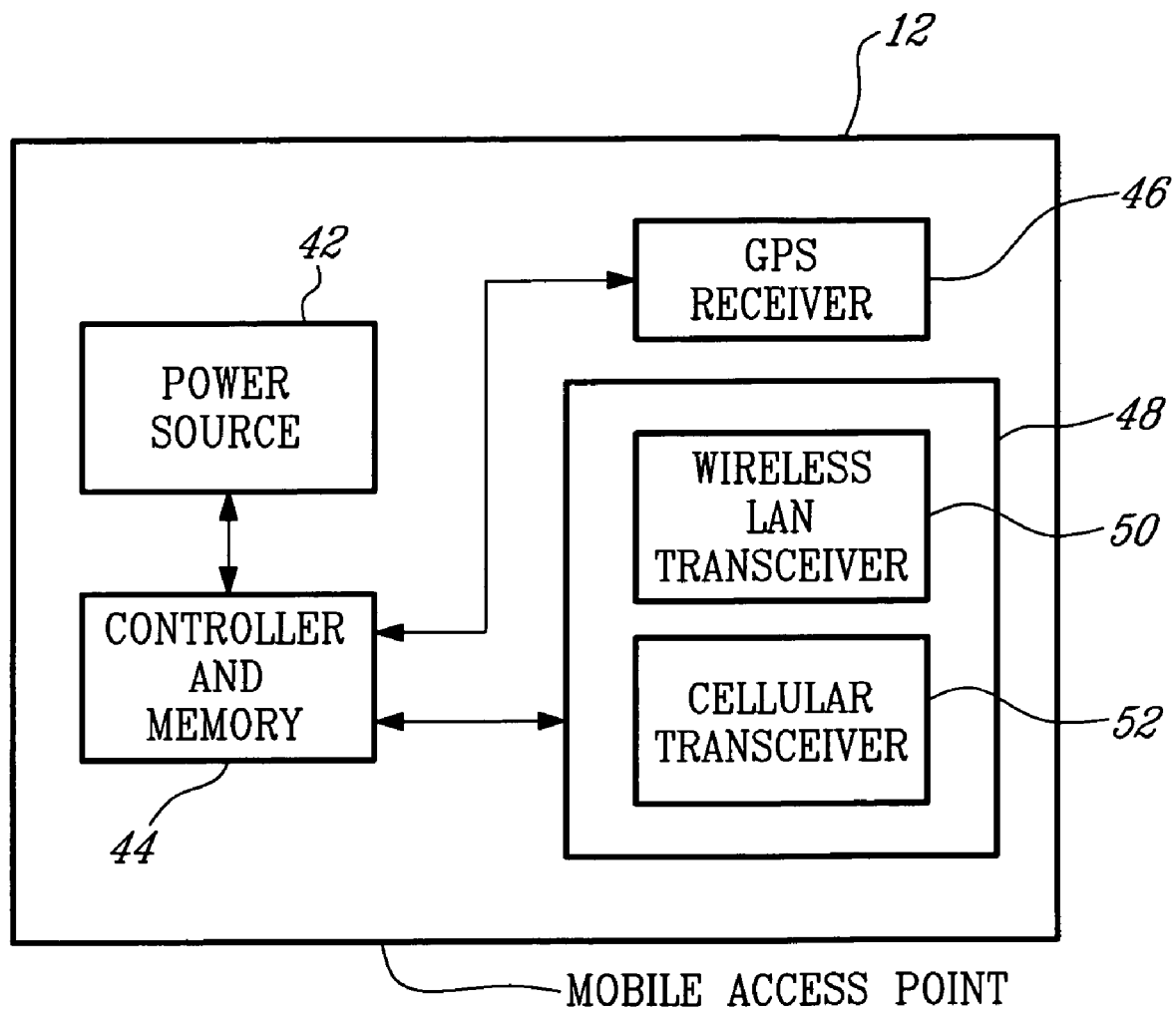
FIG. 4A is a block diagram of a mobile access point that is part of the system of FIG. 1.

Turning now to FIG. 4A of the appended drawings the various elements forming a mobile access point 12 will be described.

The mobile access point 12 includes a power source 42, usually in the form of a connection to a battery of the vehicle to which the access point 12 is to be mounted, a controller 44 including memory, a GPS receiver 46 connected to the controller 44 and a communication module 48 also connected to the controller 44.

The communication module 48 includes a wireless LAN transceiver 50 and a cellular transceiver 52.

The controller 44 is supplied by the power source 42 and receives GPS position data from the GPS receiver 46 and may send and receive data to/from the tracking device 14 and to/from the central server 10 via the communication module 48.

A mobile access point could be made using a controller made Texas Instruments under part number TMS 320-5470 and a GPS receiver made by Trimble under part number Lassen LP. As it will easily be understood by one skilled in the art, the wireless LAN transceiver 50 uses the same technology as the wireless LAN transceiver 26 of the tracking device 14.

Figure 4B:
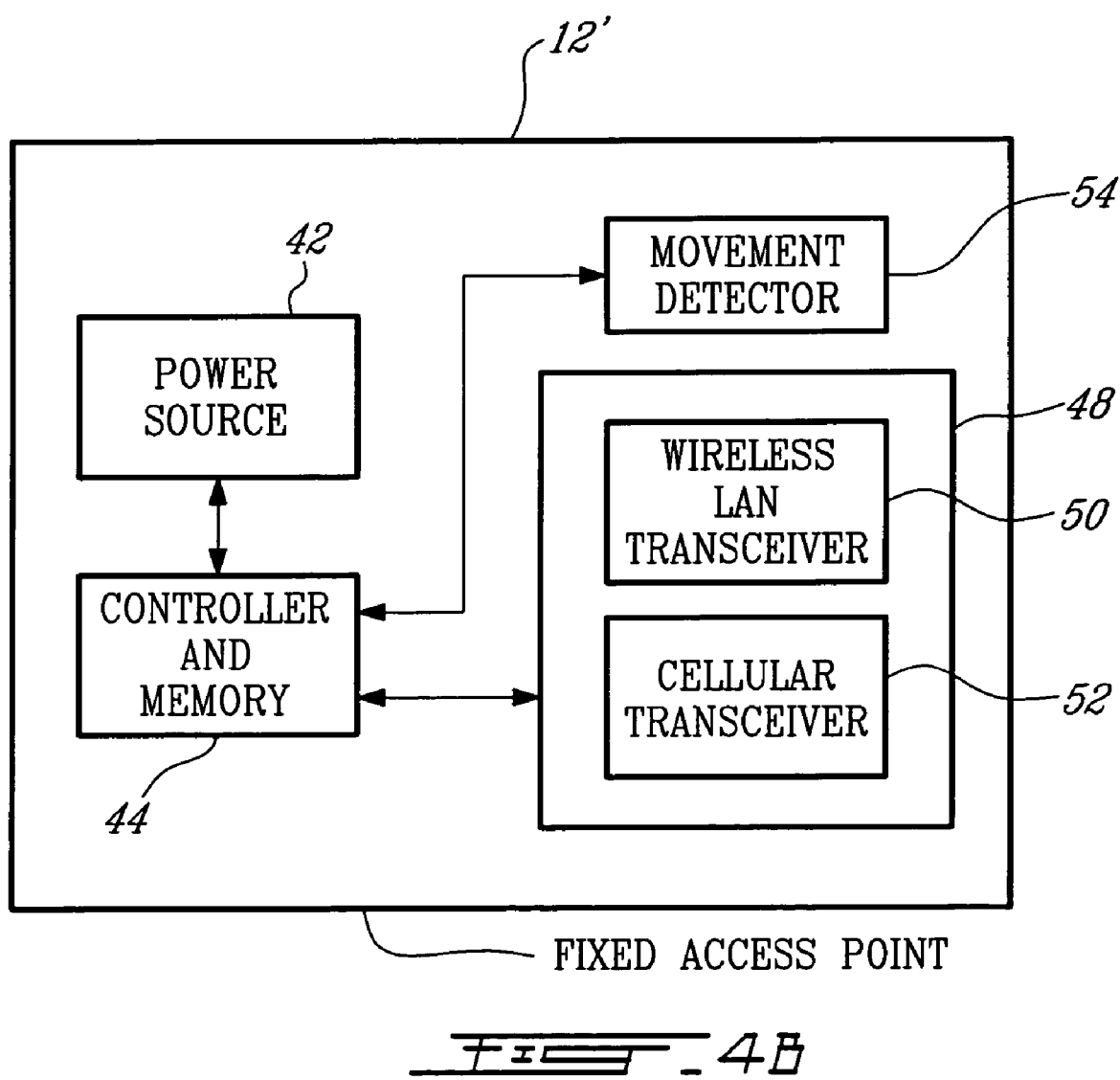
FIG. 4B is a block diagram of a fixed access point that is part of the system of FIG. 2.

Turning now briefly to FIG. 4B of the appended drawings, a fixed access point 12' will be described. It is to be noted that since the fixed access point 12' is very similar to the mobile access point 12 described hereinabove and illustrated in FIG. 4A, only the differences between these access points will be described hereinbelow.

The fixed access point 12' does not include a GPS receiver since it is not supposed to move. Indeed, as illustrated in FIG. 2, the fixed access point 12' is intended to be mounted to a warehouse or other similar fixed objects.

For security purposes, the fixed access point 12' includes a movement detector 54 connected to the controller 44 so that the controller 44 receives an alarm signal should somebody try to move the fixed access point 12' without proper authorization. One skilled in the art will understand that the movement detector 54 could be an accelerometer, a gyroscope, a tilt sensor or even a GPS receiver that sends the appropriate alarm signal to the controller 44 should movement be detected. Of course, other movement sensing technologies could be used.

The setup of the cargo protection system will now be described with reference to FIG. 5 which is a general block diagram thereof.

In a first step 100, a virtual fence is generated by at least one access point 12. More specifically, the virtual fence is generated by the "bubbles" creates by the range of the wireless LAN transceiver 50 of the access point. In other words, the tracking device 14 will know that it is within the virtual fence when the wireless LAN transceiver 28 detects the wireless LAN transceiver 50. The access point 12 is therefore carefully positioned. As it will be understood by one skilled in the art, the size of the bubble may be adjusted by adjusting the range of the wireless LAN transceiver 50.

As will easily be understood by one skilled in the art the bubble could be created by other means. For example, should a predetermined perimeter of bubble be desired, the propagating time of RF signals from the tracking device to the access point could be measured by the tracking device and/or the access point to determine if the tracking device is within the bubble.

Bubbles are schematically illustrated in dashed lines in FIGS. 1 and 2. In FIG. 1, the mobile access point 12 is mounted on the roof of the trailer 58 so that the bubble 60 covers the entire trailer 58. It is to be noted that the GPS antenna (not shown), which can be integrated within the body of the access point 12 or connected to the access point 12 via a wire, is mounted outside the trailer 58 to improve GPS signals reception. In FIG. 2, the fixed access point 12' is mounted on the roof of a warehouse 62 so that the bubble 64 covers the entire warehouse 62.

As noted hereinabove, a virtual fence may be created by more than one access point. Indeed, since each access point creates a bubble, a virtual fence would be the outer limit of the intersecting bubbles. Seamless roaming between overlapping access point coverage does not cause an alarm. Accordingly, when a trailer equipped with an access point 12 is so positioned that its bubble intersects the bubble of the access point 12' of a warehouse and that a tracking device containing cargo is transferred from the warehouse to the trailer, or vice-versa, no alarm is generated. Therefore, the virtual fence may be viewed as extending from one warehouse to another via an access point equipped trailer.

In other words, if the owner of a cargo protection system according to the present invention has equipped each warehouse and trailer with an access point, the virtual fence of the system covers the entire area where the cargo may be stored with the owner's premises and moved therebetween. Accordingly, the movement of tracking devices within the virtual fence will not cause alarms to be triggered.

It is also to be noted that while the bubbles are illustrated as having a generally spherical shape, it is not always the case. Indeed, the shape and coverage of the "bubble" created by each access point depend on the antenna of the wireless LAN transceiver. For instance, a standard omni-directional antenna will broadcast in all directions (as illustrated in the appended figures), an array of two antennas will produce an 8 shape etc. Accordingly, it is not necessary to install the access point on the roof to cover the warehouse or trailer. The same effects could be achieved by placing the wireless LAN transceiver on the floor. Furthermore, in the case of the mobile access points, only the antenna of the GPS receiver need to be installed on the roof of the trailer to better receive the faint GPS signals; the rest of the access point could be installed inside the trailer. A major difference with the protection systems of the prior art is that the access point need not be concealed but could be positioned in plain sight, since the disabling of the access point automatically causes the tracking devices to generate alarm signals.

A second step 102 consists in powering a tracking device 14. When an operating tracking device 14 enters a virtual fence, it will initiate the communication with the access point 12 since an operating tracking device 14 periodically scans its environment to find a virtual fence. When in a virtual fence, the tracking device 14 will authenticate itself by sending its ID to the nearest access point and periodically receive authentication (ID) data from the access point 12 via their respective wireless LAN transceivers.

The next step is the insertion of the operational tracking device 14 in the cargo to be protected. Since the dead reckoning sensors used are advantageously 3D sensors, the orientation of the tracking device 14 inside the cargo is not critical. Therefore, it is easier to hide the tracking device 14 in the cargo. It is also to be noted that since the tracking device does not receive GPS signals or other such signals requiring a line-of-sight between the sender and the receiver, the tracking device 14 may be inserted inside the cargo.

FIGS. 1 and 2 illustrate the tracking device 14 inserted in a cargo 66 in the form of a pallet of boxes.

Once the setup of the system is completed, the operation of the cargo protection system may begin.

Figure 6:
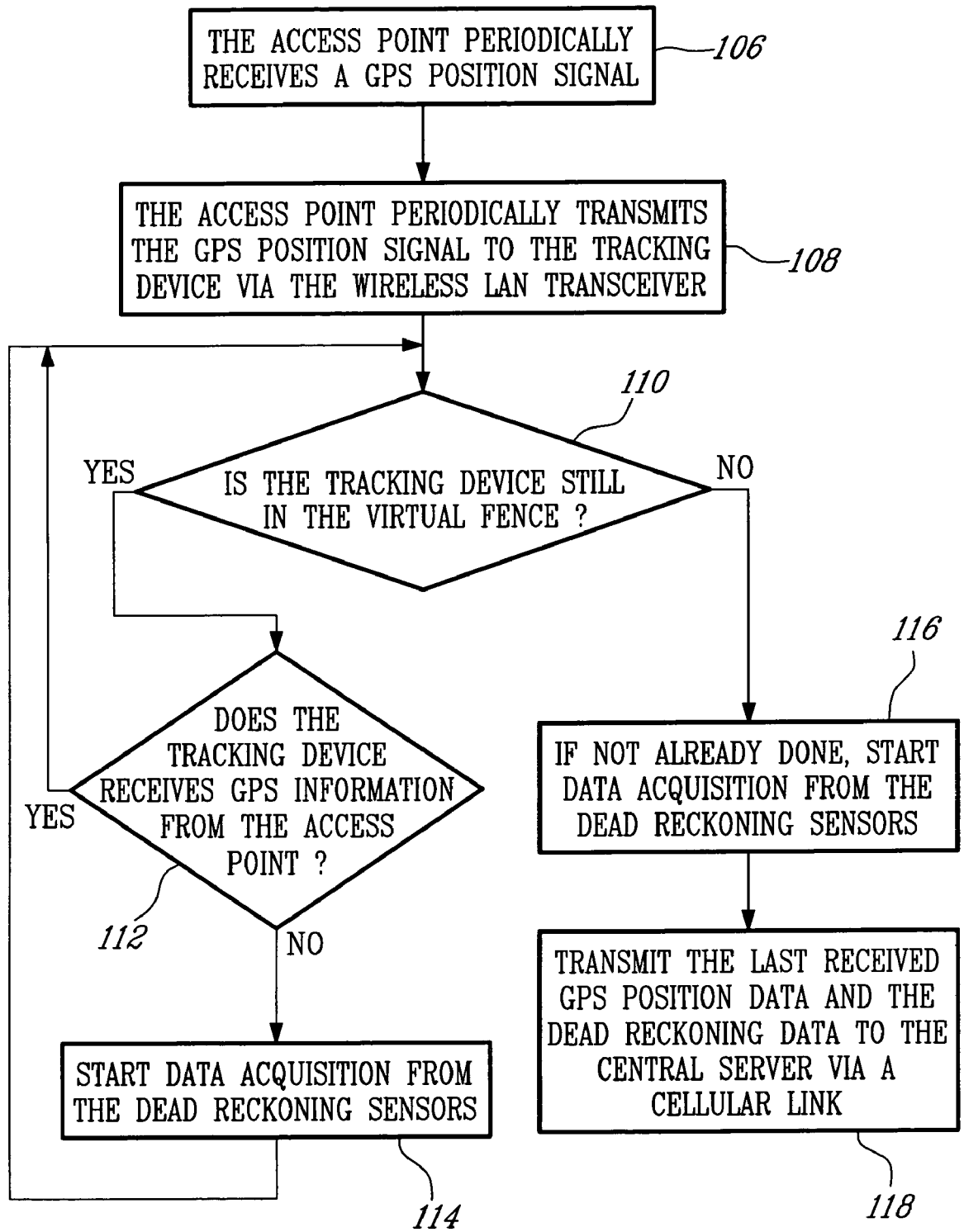
FIG. 6 is a flowchart illustrating the operation of the system of FIG. 1.

FIG. 6 of the appended drawings shows a general block diagram of the operation of the system when a mobile access point 12 is used.

Block 106 indicates that the access point 12 periodically receives position data from the GPS network 20. More specifically, the GPS position data is received by the CPS receiver 46 and transferred to the controller 44.

Block 108 indicates that the GPS position data received from the GPS receiver 46 is retransmitted to the tracking device 14. More specifically, the controller 44 supplies the GPS position data to the wireless LAN transceiver 50 that transmits it to any and all tracking devices 14 within the bubble 60.

Block 106 and 108 are repeated as long as the GPS receiver 46 receives GPS position data from the GPS network 20.

While the blocks 106 and 108 are repeated, the tracking device 14 periodically verifies that it is within the bubble 60. In other words, the tracking device 14 verifies that its wireless LAN transceiver 28 detects the wireless LAN transceiver 50 of the access point 12. Block 110 illustrates this step.

If the tracking device 14 detects that it is still within the bubble 60, it verifies that it still receives GPS position data from the access point 12 (block 112).

If the GPS position data is still received the system goes back to block 110.

Should the tracking device 14 detect that it no longer receives GPS position data from the access point 12, it starts data acquisition from the dead reckoning sensors (block 114). More specifically, the controller 24 energizes the dead reckoning module 32 and the various dead reckoning sensors included in this module start sending dead reckoning data to the controller 24 that stores it in its memory. Of course, to be useful, the dead reckoning data is time-stamped by the controller 24.

While many non-alarming reasons exist for the loss of reception of GPS position data, such as for example, the passage of the trailer through a tunnel, the loss of GPS position data can also be caused by an attempt to steal the cargo. For example, the first step of an attempt to steal the cargo could be to damage the exposed GPS receiver antenna (not shown) that is usually positioned on top of the trailer. It is therefore interesting to start the dead reckoning data acquisition as soon as the GPS position data reception is stopped.

Should the GPS position data reception resume, the controller 24 erases the stored dead reckoning data.

If, in block 110, the tracking device 14 detects that it is no longer within the bubble, the dead reckoning module 32 is energized and dead reckoning data acquisition is started (block 116), if it was not already started in block 114.

In block 118, the last received GPS position data and the acquired dead reckoning data is sent to the central server 10. More specifically, the controller 24 transmits this data to the central server 10 via the cellular transceiver 30 that communicates with the cellular network 16. It is to be noted that the system of the present invention may include anti-jamming features to ensure that the cellular communication between the transceiver 30 and the cellular network 16 is established.

Indeed, the loss of contact between the tracking device 14 and the access point 12 may mean that the tracking device containing cargo has been moved outside the bubble 60 or that the bubble 60 has been eliminated by the destruction of the access point 12. In any case, the loss of contact between the tracking device 14 and the access point 12 is reported to the central server 10 so that appropriate action is taken.

It is to be noted that if the access point 12 is still operational and stops sensing the presence of the tracking device containing cargo within its bubble, it may also contact the central server 10 via the cellular network 16, giving it the GPS position data at the time the tracking device 14 left the bubble 60.

As it will easily be understood by one skilled in the art, the central server 10 is so programmed to receive and to process the alarms and data from tracking devices. One skilled in the art will also understand that with the last known position of the cargo, as determined by the GPS position data, and the dead reckoning data received from the tracking device 14, the central server 10 may determine the current position of the cargo.

Since many methods for the determination of the current position of the cargo exist and generally depend at least on the type of dead reckoning data received, these methods will not be further described herein. These method generally use gravity models, vehicle dynamics upper bounds, digital vectorized roadmaps, driver behavioral models, gesture models and vehicle dynamics models.

It is to be noted that the appropriate action to be taken when a tracking device leaves an area delimited by the virtual fence may be configured according to the request of the owner of the system. For example, a call could be made to the law enforcement office closer to the current position of the cargo via the PSTN capabilities of the server 10; the driver of the tractor-trailer could be contacted via the cellular network 16 to ensure that it is not a false alarm and/or the owner of the cargo could be contacted via the internet 18.

When the system uses a fixed access point 12' as illustrated in FIG. 2, the operation of the system for cargo protection is very similar. The main difference resides in the lack of a GPS receiver in the fixed access point 12'. When a tracking device containing cargo leaves the bubble 64, the tracking device 14 sends the known location of the warehouse 62 and the dead reckoning data acquired through the dead reckoning module 32. It is to be noted that the cargo is free to be moved within the bubble without triggering an alarm.

It is to be noted that while only one cargo containing a tracking device 14 is illustrated in FIGS. 1 and 2, many such cargos could be shipped in the same trailer or stored in the same warehouse. Furthermore, when more than one tracking device is present in the same bubble, they may communicate with one another via their respective wireless LAN transceiver to create an ad-hoc network of tracking devices. This may prove interesting since they may share dead reckoning data to improve accuracy. Similarly, the tracking devices may take turn at contacting the central server 10 via the cellular network to thereby decrease overall power consumption and increase their respective battery life.

FIG. 7 of the appended drawings schematically illustrates a trailer 200 in which three cargo 66A, 66B and 66C equipped with respective tracking devices 14A, 14B and 14C. Since the tracking devices are no longer within the virtual fence, their dead reckoning capabilities are enabled. As can be seen from this Figure the three tracking devices communicate their dead reckoning data and control information, and the tracking device 14A communicates with the server 10 via the cellular network 16.

Many additional optional features may be introduced to the system described hereinabove. For example, a hand-held communication device; real-time cargo location; access point integrity check; power management; unauthorized mobile access point displacement and increased tracking device computing power, may be integrated to the system described hereinabove. These features will be generally described hereinbelow.

A hand-held communication device, such as a palm-type computer or a cellular phone, could be supplied to each member of the cargo handling personnel. When this is the case, many features may be added to the system. For example, the employee may use the hand-held device to authenticate himself and gain access to tracking devices or access points (if he is so authorized). He can then, depending on his authorizations:

Install a new access point to extend the virtual fence;

Provide an access point with the trailer/truck or warehouse ID with which it is associated;

Provide a tracking device with the associated shipment ID;

Unarm the tracking device so it will not trigger an alarm when the associated cargo is removed from the virtual fence; and Set the tracking device in recovery mode—for instance the tracking device will start producing a high-frequency sound so it can be easily found.

The central server or supervisor can call the cellular-enabled hand-held device to authenticate the cargo handler and ask for an explanation when an alarm is detected to thereby reduce the number of false alarms.

One skilled in the art will understand that the hand-held communication device could use biometric identification and authentication.

The system described hereinabove, could also be used as a real-time cargo location simply by having the access point 12 periodically send its GPS position to the central server 10 via the cellular network 16. This way, the central server 10 would be able to position the cargo onto a map and supply this information to the cargo owner or recipient via the internet 18, for example.

Another interesting feature is to make the tracking devices regularly authenticate and check the integrity of access points to detect rogue access points. Indeed, an ingenious thief could design counterfeit access points to try to fool the tracking devices and steal the cargo they protect. Should a tracking device detect such a counterfeit access point, the dead reckoning data acquisition and transmission would be triggered.

In view of efficiently operating the tracking devices, it is interesting to always use the access point as proxy for cellular communications with the central server when the tracking device is within the bubble. By limiting itself to wireless LAN communication, the tracking device can extend its battery life.

The unauthorized displacement of a mobile access point, which could extend the virtual fence to unauthorized locations, can be detected, for example by defining a geographic boundary and downloading this information in the access point, or by requiring the truck driver equipped with the hand-held device to authenticate himself when the mobile access point is moved after having remained idle for a certain time.

It could also be interesting to pre-process the dead reckoning data directly in the controller 24 of the tracking device before sending it to the central server 10, especially when lower bandwidth is available, for example when jamming is detected and counteracted. The controller 24 could, for example, be able to recognize some gestures such as coming to a complete stop, taking a ninety degrees right turn and supply this time-stamped data to the central server instead of supplying the raw dead reckoning data. However, it is to be noted that since the central server 10 has virtually unlimited computational power, when possible raw dead reckoning data should be supplied thereto to allow, for example, multiple algorithms to determine current position to run simultaneously to thereby improve accuracy and/or certainty. Of course, a certain amount of pre-processing such as frequency band filtering, sampling quantizing, coding and compression is advantageously made by the controller of the tracking device.

Although the present invention has been described hereinabove by way of preferred embodiments thereof, it can be modified, without departing from the spirit and nature of the subject invention as defined in the appended claims.

What is claimed is:

1. A system for the protection of cargo comprising:
a tracking device to be inserted in a cargo; said tracking device including a communication module and a dead reckoning module; said communication module being configured to communicate with a central server; and
an access point including a GPS receiver and a communication module configured to communicate wit said tracking device communication module; said access point being so configured as to periodically supply GPS position data to said tracking device;
wherein said tracking device is so configured that when the communication between the tracking module and the access point is lost, a last received GPS position data and dead reckoning data from said dead reckoning module are transmitted by the tracking module to the central server via said communication module of the tracking device.

2. The cargo protection system of claim 1, wherein said communication module of said tracking device includes a wireless LAN transceiver.

3. The cargo protection system of claim 2, wherein said communication module of said access point includes a wireless LAN transceiver configured to communicate with said wireless LAN transceiver of said tracking device; the GPS position data being transmitted from said access point to said tracking device via said respective wireless LAN transceivers.

4. The cargo protection system of claim 1, wherein said communication module of said tracking device includes a cellular transceiver enabling the tracking device to communicate with the central server.

5. The cargo protection system of claim 1, wherein said communication module of said access point includes a cellular transceiver enabling the tracking device to communicate with the central server.

6. The cargo protection system of claim 1, wherein said tacking device includes a controller interconnecting said communication module and said dead reckoning module.

7. The cargo protection system of claim 6, wherein said controller includes memory to temporarily store dead reckoning data supplied by said dead reckoning module.

8. The cargo protection system of claim 1, wherein said access point includes a controller interconnecting said GPS receiver and said communication module.

9. The cargo protection system of claim 8, wherein said controller of said access point includes, memory to temporarily store GPS position data supplied by said GPS receiver.

10. The cargo protection system of claim 1, wherein said dead reckoning module of said tacking device includes at least one dead reckoning sensor selected from the group consisting of an accelerometer, a gyroscope, a magnetometer, an electrolytic tilt sensor and an electronic compass.

11. The cargo protection system of claim 10, wherein said accelerometer, gyroscope, electrolytic tilt sensor and electronic compass are 3D devices.

12. The cargo protection system of claim 10, wherein said dead reckoning module further includes a thermistor.

13. The cargo protection system of claim 1, wherein said tracking device further includes a high frequency sound generator.

14. The cargo protection system of claim 1, wherein said access point is mounted to a trailer so that the range of the communication module of the access point generates a virtual fence around the trailer.

15. The cargo protection system of claim 1, further including a hand-held communication device that is periodically in communication with the central server.

16. The cargo protection system of claim 15, wherein, when the communication between the tracking module and the access point is lost, the notified central server communicates with said hand-held communication device to determine if a false alarm exists.

17. The cargo protection system of claim 15, wherein said hand-held communication device is used to authenticate a user and allow system operations to be performed.

18. A system for the protection of cargo comprising:

cargo tracking means including communication means and dead reckoning means; said communication means being configured to communicate with a central server; and means for creating a virtual fence around the cargo; said virtual fence creating means including means for receiving GPS position data and communication means configured to communicate with said communication means of said cargo tracking means; said virtual fence creating means being so configured as to periodically supply GPS position data to said cargo tracking means;

wherein when the communication between the cargo tracking means and the virtual fence creating means is lost, a last received GPS position data and dead reckoning data from said dead reckoning means are transmitted to the central server via said cargo tracking means communication means.

19. A method for the protection of cargo comprising the acts of:

providing a cargo tracking device to a cargo; the cargo tracking device including a communication module and a dead reckoning module;

creating a virtual fence around an area where the cargo is located;

providing GPS position data to the cargo tracking device while the cargo is within the virtual fence;

when the cargo exits the virtual fence;

obtaining dead reckoning data from the dead reckoning module;

transmitting a last received GPS position data to a central server via the communication module of the cargo tracking device; and transmitting dead reckoning data to a central server via the communication module of the cargo tracking device.

20. The cargo protection method of claim 19, wherein said virtual fence creating act includes providing an access point having a communication module having a communication range defining a virtual fence.

21. The cargo protection method of claim 19, wherein said virtual fence creating act includes providing at least two access points having respective communication modules having respective communication ranges; said virtual fence being defined by the outer limit of overlapping ranges of the communication modules.

22. The cargo protection method of claim 19, further comprising the analysis by the central sever of the last received GPS position data and the dead reckoning data to determine the current position of the cargo.

23. The cargo protection method of claim 19, wherein said last received GPS position data transmission act includes establishing a cellular communication between the tracking device and the central server.

24. The cargo protection method of claim 19, wherein said dead reckoning data transmission act includes establishing a cellular communication between the tracking device and the central server.

25. The cargo protection method of claim 19 further comprising the act of transmitting an alarm from the tracking device to the central server when the cargo tracking device exits the virtual fence.

* * * * *